(12) United States Patent
Meller et al.

(10) Patent No.: US 8,578,359 B2
(45) Date of Patent: Nov. 5, 2013

(54) METHOD AND APPARATUS FOR RELIABLE IN-PLACE UPDATE

(75) Inventors: Evyatar Meller, Petach-Tikva (IL); Sharon Peleg, Ramat Hasharon (IL)

(73) Assignee: Red Bend Ltd., Hod Hasharon (IL)

( * ) Notice: Subject to any disclaimer, the term of this patent is extended or adjusted under 35 U.S.C. 154(b) by 1217 days.

(21) Appl. No.: 10/593,051

(22) PCT Filed: Mar. 15, 2005

(86) PCT No.: PCT/IL2005/000296
§ 371 (c)(1),
(2), (4) Date: Sep. 8, 2008

(87) PCT Pub. No.: WO2005/088448
PCT Pub. Date: Sep. 22, 2005

(65) Prior Publication Data
US 2008/0320461 A1    Dec. 25, 2008

Related U.S. Application Data

(60) Provisional application No. 60/552,752, filed on Mar. 15, 2004.

(51) Int. Cl.
*G06F 9/44* (2006.01)
*G06F 9/445* (2006.01)

(52) U.S. Cl.
USPC ............ 717/168; 717/122; 717/170; 717/177

(58) Field of Classification Search
None
See application file for complete search history.

(56) References Cited

U.S. PATENT DOCUMENTS

| | | | |
|---|---|---|---|
| 5,247,660 A | | 9/1993 | Ashcraft et al. |
| 5,752,039 A | * | 5/1998 | Tanimura ................. 717/168 |
| 5,802,554 A | * | 9/1998 | Caceres et al. ............. 711/103 |

(Continued)

FOREIGN PATENT DOCUMENTS

| | | |
|---|---|---|
| EP | 1 120 709 A2 | 8/2001 |
| WO | WO 02/41147 A1 | 5/2002 |
| WO | WO 2004/114130 A2 | 12/2004 |
| WO | WO 2005/003963 A2 | 1/2005 |

OTHER PUBLICATIONS

Sun Microsystems; Memory Management in the Java HotSpot Virtual Machine; [Jun. 2006]; retrieved online on Jun. 13, 2013; pp. 1-21; Retrieved from the Internet: <URL: http://www.oracle.com/technetwork/java/javase/memorymanagement-whitepaper-150215.pdf>.*

(Continued)

*Primary Examiner* — Thuy Dao
*Assistant Examiner* — Hanh T Bui
(74) *Attorney, Agent, or Firm* — Buchanan Ingersoll & Rooney PC

(57) ABSTRACT

Method and apparatus for in-place updating an old version of a file stored on a storage device to form a new version, wherein the old version includes blocks. The form of the old version is determined for indicating at which end of the old version free space is located, as well as determining whether an update package is a corresponding update package for the form. If the update package is a corresponding update package, blocks in the old version are updated according to the update package, giving rise to a new version having an alternative form, where free space in the new version is at an opposite end to the old version.

9 Claims, 6 Drawing Sheets

(56) References Cited

U.S. PATENT DOCUMENTS

| | | | |
|---|---|---|---|
| 6,018,747 A | 1/2000 | Burns et al. | |
| 6,546,552 B1 | 4/2003 | Peleg | |
| 6,789,215 B1* | 9/2004 | Rupp et al. | 717/168 |
| 6,832,373 B2 | 12/2004 | O'neill | |
| 6,983,449 B2* | 1/2006 | Newman | 717/122 |
| 7,409,685 B2* | 8/2008 | Chen et al. | 717/170 |
| 7,533,378 B2* | 5/2009 | Maeda et al. | 717/168 |
| 7,657,886 B1* | 2/2010 | Chen et al. | 717/170 |
| 7,661,102 B2* | 2/2010 | Ogle | 717/168 |
| 7,703,074 B2* | 4/2010 | Kamen et al. | 717/122 |
| 7,712,094 B2* | 5/2010 | Shapiro | 717/177 |
| 7,739,660 B2* | 6/2010 | Sun | 717/122 |
| 7,747,997 B1* | 6/2010 | Rao | 717/170 |
| 7,797,693 B1* | 9/2010 | Gustafson et al. | 717/168 |
| 8,266,615 B2* | 9/2012 | Shapiro | 717/177 |
| 8,286,159 B2* | 10/2012 | Shapiro | 717/177 |
| 2001/0029178 A1* | 10/2001 | Criss et al. | 455/419 |
| 2003/0110482 A1* | 6/2003 | Ferguson et al. | 717/168 |
| 2004/0044869 A1 | 3/2004 | Louie et al. | |
| 2005/0102660 A1* | 5/2005 | Chen et al. | 717/168 |
| 2007/0089108 A1* | 4/2007 | Chen et al. | 717/168 |
| 2008/0320461 A1* | 12/2008 | Meller et al. | 717/168 |

OTHER PUBLICATIONS

Li-Pin Chang and Tei-Wei Kuo; Efficient Management for Large-Scale Flash-Memory Storage Systems with Resource Conservation; [Nov. 2005]; retrieved online on Jun. 13, 2013; pp. 381-418; Retrieved from the Internet: <URL: http://delivery.acm.org/10.1145/1120000/1111610/p381-chang.pdf?>.*

Yu-Cheng Tseng et al.; Block-based Belief Propagation With In-place Message Updating for Stereo Vision; [2008]; retrieved online on Jun. 13, 2013; pp. 918-921; Retrieved from the Internet: <URL: http://ieeexplore.ieee.org/stamp/stamp.jsp?tp=&arnumber=4746173>.*

* cited by examiner

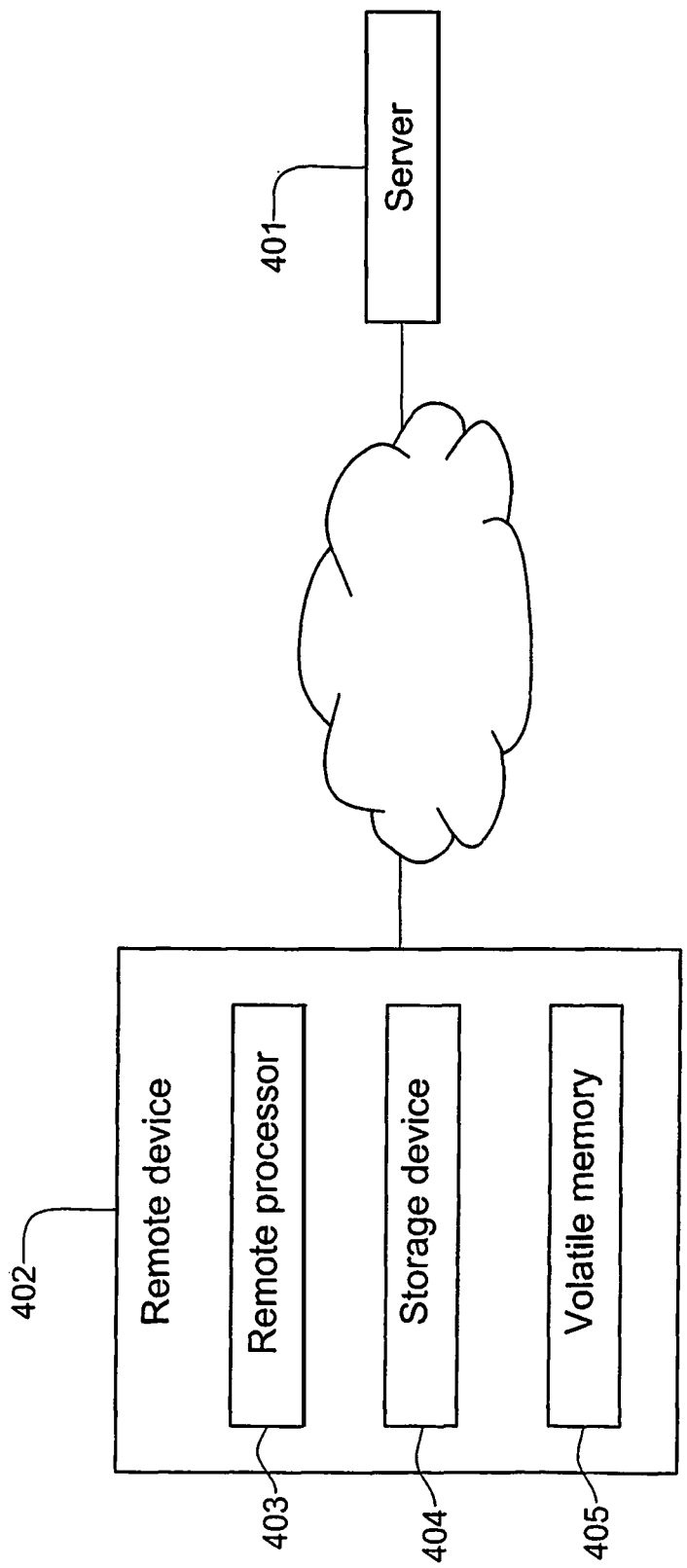

METHOD AND APPARATUS FOR RELIABLE IN-PLACE UPDATE

FIELD OF THE INVENTION

This invention relates to reliably updating storage devices and more specifically to reliably reading and writing data from and in to non volatile storage devices during in-place update.

BACKGROUND OF THE INVENTION

It is sometimes required to update content stored in a storage device. For example, if the content is software (such as an executable file), it is sometimes required to fix a bug in it. However, it should be noted that other types of content may also require updates, such as text, etc. Hereinafter the term "old version" refers to content before update, the term "new version" refers to the content after it was updated.

There are several ways known in the art for generating update packages and using them for updating versions. For example, U.S. Pat. No. 6,546,552 ("Difference extraction between two versions of data-tables containing intra-references", published 2003) discloses a method for generating a compact difference result between an old program and a new program. Each program includes reference entries that contain references that refer to other entries in the program. According to the method of U.S. Pat. No. 6,546,552, the old program is scanned and for each reference entry the reference is replaced by a distinct label mark, whereby a modified old program is generated. In addition, according to U.S. Pat. No. 6,546,552, the new program is scanned and for each reference entry the reference is replaced by a distinct label mark, whereby a modified new program is generated. Thus, utilizing directly or indirectly the modified old program and modified new program, the difference result is generated.

WO 2004/114130 ("Method and system for updating versions of content stored in a storage device", published 2004) discloses a system and method for generating a compact update package between an old version of content and a new version of content. The system of WO 2004/114130 includes a conversion element generator for generating a conversion element associated with the old version and new version. It also includes a modified version generator for generating a modified version, and an update package generator for generating the compact update package. The compact update package includes the conversion element and a modified delta based on the modified version and the new version.

WO 2005/003963 ("Method and system for updating versions of content stored in a storage device", published 2005) discloses a system and method for updating versions of content stored in a storage device. The system of WO 2005/003963 includes an update module for obtaining a conversion element and a small delta. It also includes a converted old items generator for generating converted old items by applying the conversion element to items of an old version, a data entries generator for generating data entries based on the modified data entries and on the converted old item, and a new version generator for generating a new version of content by applying the commands and the data entries to the old version.

U.S. Pat. No. 6,832,373 ("System and method for updating and distributing information", published 2004) discloses devices, systems and methods for updating digital information sequences that are comprised by software, devices, and data. In addition, these digital information sequences may be stored and used in various forms, including but not limited to files, memory locations, and/or embedded storage locations. Furthermore, the devices, systems, and methods described in U.S. Pat. No. 6,832,373 provide a developer skilled in the art with an ability to generate update information as needed and, additionally, allow users to proceed through a simplified update path, which is not error-prone, and may be performed more quickly than through the use of technologies existing when U.S. Pat. No. 6,832,373 was filed.

It is known to persons versed in the art that content is stored in a storage device, such as disk or memory. Some storage devices are organized in blocks. Also, sometimes the new version can use the same blocks previously occupying the old version. For example, if the available storage in the device is limited in space, it can be preferred to store the new version in place of the old version, saving space thereby. Such an update process, where the new version occupies at least some of the space previously occupied by the old version, is referred in the art as "in-place update". It should be noted that hereinafter the content of a block being part of the old version is referred to as "old block" and accordingly the content of a block being part of the new version is referred to as "new block".

One of the outcomes of this method is that once a storage block has been updated, its previous content being part of the old version is lost. A known problem in the art occurs when a process of updating an old version is interrupted in an unorderly manner, such as the case of power failure. In case of such interruption there is a possibility that the content of the block which was being updated during the interruption may be corrupted and contain unexpected content. In the case of in-place updating, if a block becomes corrupted, then when trying to resume the process, it could be impossible to re-update the corrupted block. That is, when updating blocks of content, an old block sometimes forms part of the input used by the update process to a new. In such a case if the old block (which is corrupted) is required, the update process can not resume.

It is known the art, that in cases where storage content is being in-place updated and the process may also be subject to interruptions, the method to resolve the above problem of corrupted block is to use an auxiliary backup block and perform all block update operations by using two steps for each block. This method is also referred in the art as 'two-phase protocol' or 'two-phase commit'. According to this method, in a first phase, when updating a block, the update process writes the new content to the backup block and verifies that the content is correctly stored. In a second phase, the update process copies the content of the verified backup block into its target block to form the new block. It is readily appreciated to a person versed in the art that other variations of the same method exist, such as copying the old block to the backup block in the first phase and in the second phase updating the target block to form the new block.

It is appreciated by person versed in the art that in order to resume an in-place update process it may be also required to restore some additional data that reflects the state of the process as it was before being interrupted. It is also appreciated by person versed in the art that sometimes this data can not be restored by computation, in case this data is based on content of some old blocks that were already modified. The common practice in the prior art is to maintain a record of this particular data in a storage device accessible to the update process, and to update it during the update process, to reflect its progress It is appreciated the update procedure includes read and write operations. Using a two-phase commit procedure creates a time performance problem since the amount of read and write operations is doubled.

For example, updating the software of embedded devices such as mobile phones requires in-place updating due to the severe size constraints on its storage, especially the storage part used for holding its software. For economical reasons, mobile phones are not built to have enough storage to hold two full versions of the software and if a mobile phone is required to update its software, it is appreciated that it will require the method of in-place update.

Updating mobile phone's software is a relatively slow process due to the speed of the storage devices used (for example Flash memory). During the update process the phone is inoperable, creating the need to minimize the time it takes.

SUMMARY OF THE INVENTION

It is therefore an object of the invention to allow in-place updating of old versions without the use of an auxiliary backup block.

This object is realized in accordance with a first aspect of the invention by a method of in-place updating an old version of a file stored on a storage device to form a new version, the old version including blocks, the method comprising:
  determining (i) a form of said old version, indicating at which end of the old version a free space is located, and (ii) whether an update package is a corresponding update package for said form; and if so
  updating blocks in said old version according to said corresponding update package, giving rise to a new version having an alternative form, where a free space in the new version is at an opposite end to the old version.

According to one embodiment of the invention said form being a B-form and said alternative form being an E-form.

According to a different embodiment of the invention said form being an E-form and said alternative form being a B-form.

According to another embodiment, the method further comprising:
  for each block in said new version, verifying that content in said new block is successfully stored.

According to an embodiment of the invention said storage device is accommodated on a cellular telephone.

According to yet a different embodiment the method further comprising:
  determining whether an amount of free space in the old version is too small to allow in-place update of the old version to the new version; and
  if so, enlarging said free space to allow said in-place update.

According to a different embodiment of the method said enlarging includes:
  updating said old version to a temporary version having content equivalent to said old version with an alternative form to said old version and a larger free space than in said old version; and
  updating said temporary version to form said new version The object of the invention is also realized in accordance with another aspect of the invention by a method of in-place updating an old version of a file stored on a storage device of a remote device to form a new version, the method comprising:
  determining a form of said old version, indicating at which end of the old version free space is located;
  generating an update package that is adapted for said form of the old version; and
  conveying said update package to said remote device.

The invention further provides systems corresponding to said methods.

BRIEF DESCRIPTION OF THE DRAWINGS

In order to understand the invention and to see how it may be carried out in practice, a preferred embodiment will now be described, by way of non-limiting example only, with reference to the accompanying drawings, in which:

FIG. 4 is a block diagram illustrating a system allowing in-place update according to one embodiment of the invention.

DETAILED DESCRIPTION OF EXEMPLARY EMBODIMENTS

It should be noted that the term "file" is used hereinafter to refer to a collection of one or more blocks in a storage device which are the subject of an update process.

It should also be noted that hereinafter, unless specifically noted, the term "update" is used to refer to in-place update.

Figure 1A:
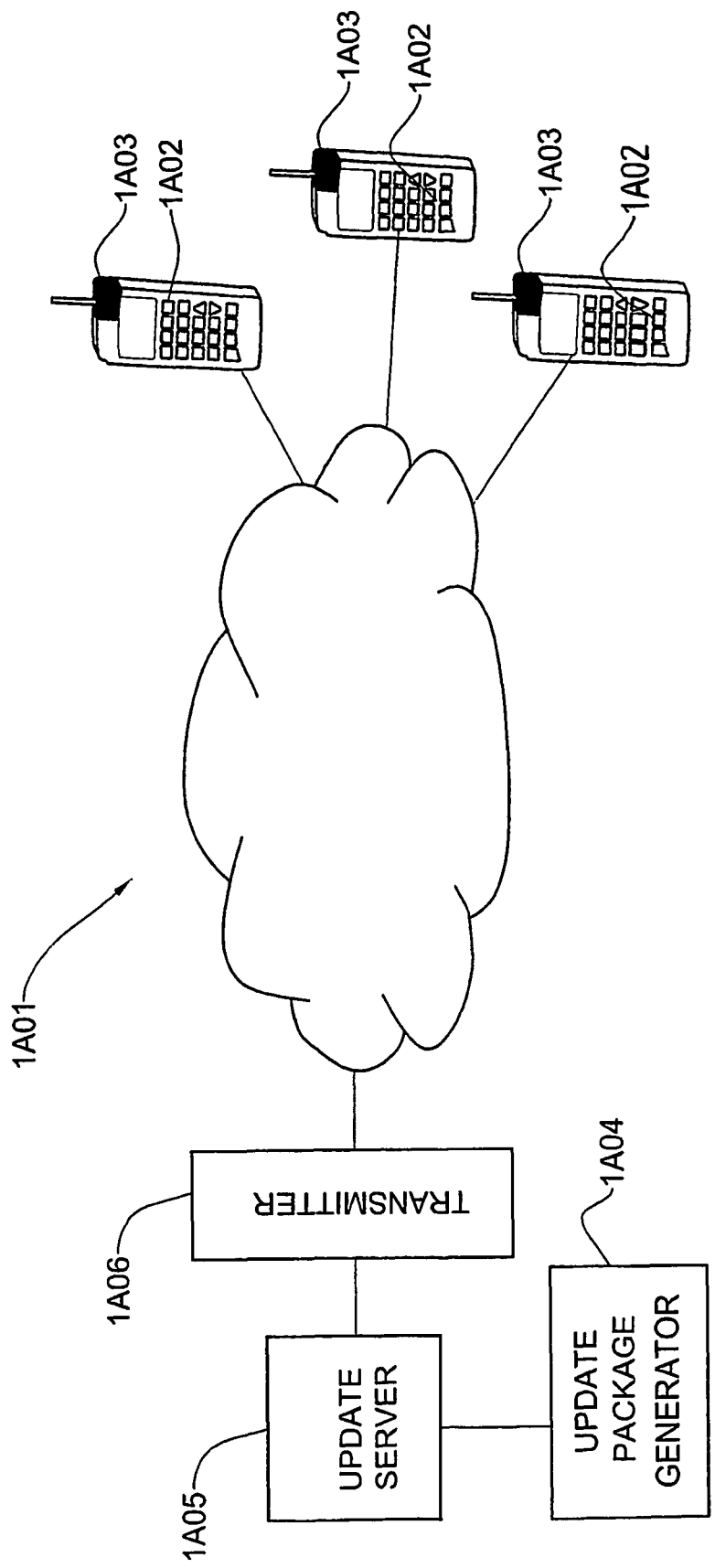
FIG. 1A is a schematic illustration of a system for updating versions in a cellular network, according to one embodiment of the invention.

FIG. 1A is a schematic illustration of a system 1A01 for updating versions in a cellular network, in accordance with one embodiment of the invention. Cellular telephones 1A02 that are coupled to ox include memory devices 1A03, execute programs that enable their operation. The version of the program currently executing on the cellular telephones is referred to, hereinafter, as an "old version" or as an "original version". Sometimes there is a need to update the programs in order for the telephones 1A02 to execute a newer versions thereof. Such an updated version is constructed by an update process executing in the telephone in accordance with an update package.

The update package is generated in an update package generator 1A04, operating, for example, in a personal computer (PC) or in any other type of computer. The update package is stored in an update server 1A05 and transmitted, via a transmitter 1A06 to the cellular telephones 1A02.

It should be noted that the system 1A01 illustrated in FIG. 1A is a non-binding example and the invention is not limited to cellular networks or to updating programs. Many other types of content stored in storage devices require update, such as data stored in databases, files stored in the storage device etc. Therefore, hereinafter the term "content" will be used instead of "program".

In the same way, the invention is not limited to cellular telephones 1A02. It should be appreciated that cellular telephones belong to a group referred to as embedded devices. There are other embedded devices, such as Personal Digital Assistants (PDAs), set-top boxes and other consumer electronic devices that are coupled to storage devices for storing content, and sometimes it is required to update the content stored therein. However, it is possible to update also content stored in storage devices coupled to non-embedded devices, such as PCs or other computers. Furthermore, the storage devices 1A03 can be, for example, hard-disk drives, Flash-memory devices or any other storage device.

For example, a PC, or any other computer, can store files that include data required for its operation or for operation of programs executing therein (such as "info files" or "dot files" known for those versed in the art). Sometimes it is required to update this data via communications lines, e.g., via the internet or via any other communication mean.

In order to update content stored in the storage devices, update packages are generated, stored in the update server 1A05 and transmitted to the storage devices or to other devices coupled therewith (such as the cellular telephones 1A02). Alternatively, it is possible to transmit an update package without storing it first in an update server 1A05. For example, it is possible to transmit the update package directly from the version generator where it is generated. In such a case the machine where the update generator operates or the update generator itself is considered as the update server 1A05. In yet a different embodiment the update package generator 1A04 is not directly coupled with the update server 1A05. It should be noted that the update server 105 can receive update packages conveyed to it by the update package generator 1A04, while it can also receive the update packages by any other means such as reading them from a portable storage device (such as disk-on-key, a compact disk or a floppy disk) etc.

Figure 1B:
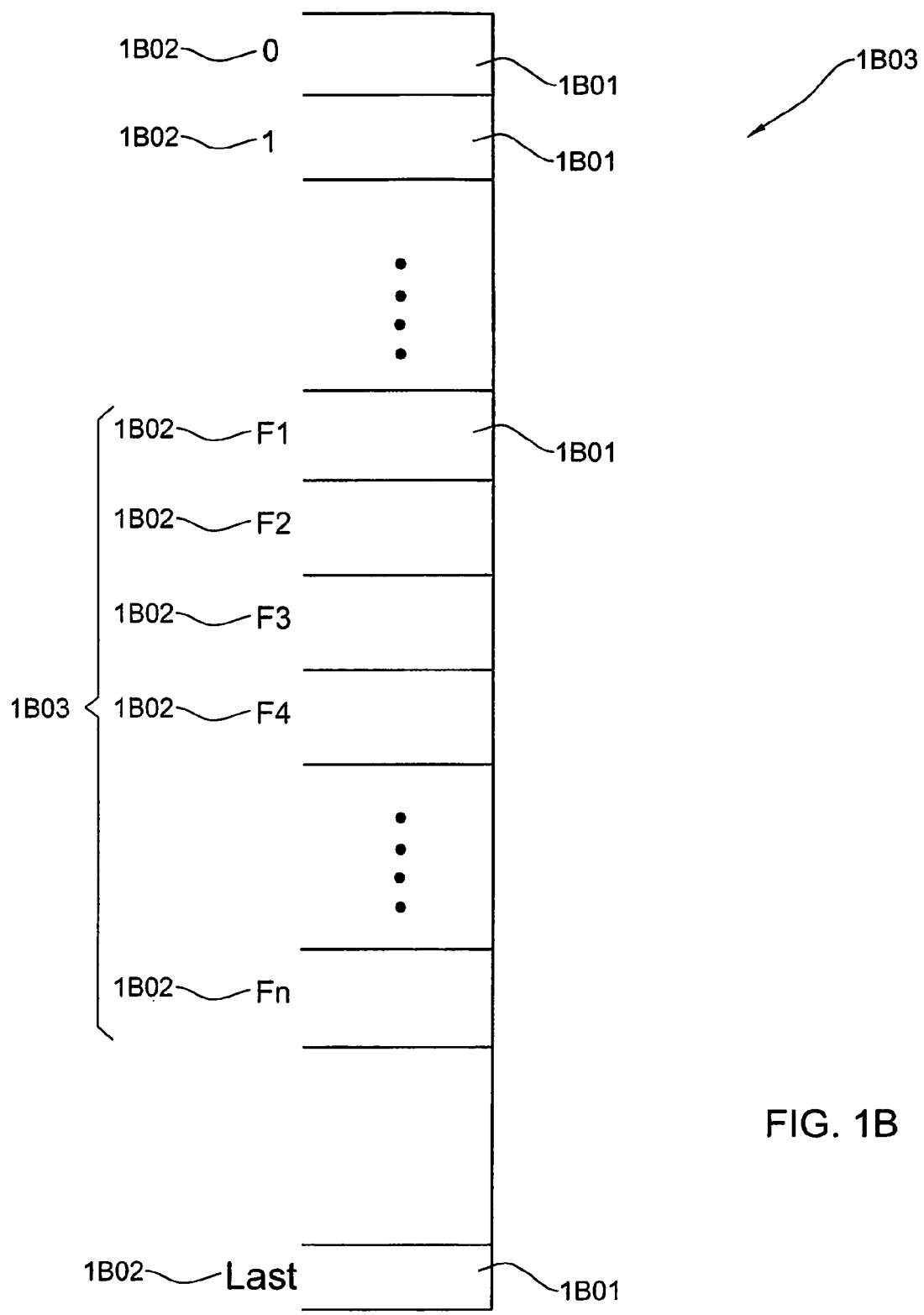
FIG. 1B illustrates blocks in a storage device, according to one embodiment of the invention.

When a cellular telephone 1A02 receives an update package, it can operate an update process in accordance with the update package, wherein the update process updates the original version for generating another version referred to as an "updated version" or as a "new version". It should be noted that the cellular telephone 1A02 can operate the update process immediately after receiving the update package. Alternatively it can store the update package in a non-volatile memory, such as in the storage device 1A03, and operate the update process in some later time (such as on the next time the telephone reboots). It should be appreciated that many times storage devices 1A03 are organized in blocks. FIG. 1B illustrates blocks 1B01 in a storage device 1A03. According to one embodiment of the invention, each block 1B01 can have an associated index 1B02, such as 0, 1, . . . and/or $F_1, F_2, \ldots, F_n$ as illustrated in the figure. The method of indexing is non-binding and any other method, including a combination of several methods is allowed. For example, in an alternative embodiment the address of a block can be used as its index. Indexes can be used for accessing blocks or content stored therein, such as for reading, writing or erasing content.

Stored content can span over one or more blocks, constituting a logical entity, sometimes referred to as a "file". The file need not be stored in whole blocks; rather, it can start at some point along, or in the middle of a block and end somewhere along, or in the middle of another block. In the figure, the blocks marked together by the reference numeral 1B03 constitute together an exemplary file. It is assumed that in order to update a file the location of the file's content should be given to the update process. The location can be given to it by providing the index of the first block where the file begins (and the location along the block, if required), or it can be computed by the update process, when sufficient data that is required in order to allow such a computation is provided. Furthermore, it is known per se that a file can be constituted of several blocks, two or more of them can be non-sequential blocks, unlike the sequential file 1B03 illustrated in FIG. 1B.

For example, a file could associate blocks $F_1, F_4, F_n$ (wherein blocks $F_2$ and $F_3$, for example are not part thereof). In addition, files do not need to be organized in an ascending or descending order. A file wherein the blocks are ordered, for example as $F_3, F_1, F_4, \ldots, F_n$ is a legitimate file, although $F_1$ appears to precede block $F_3$ in the storage device.

Figure 1C:
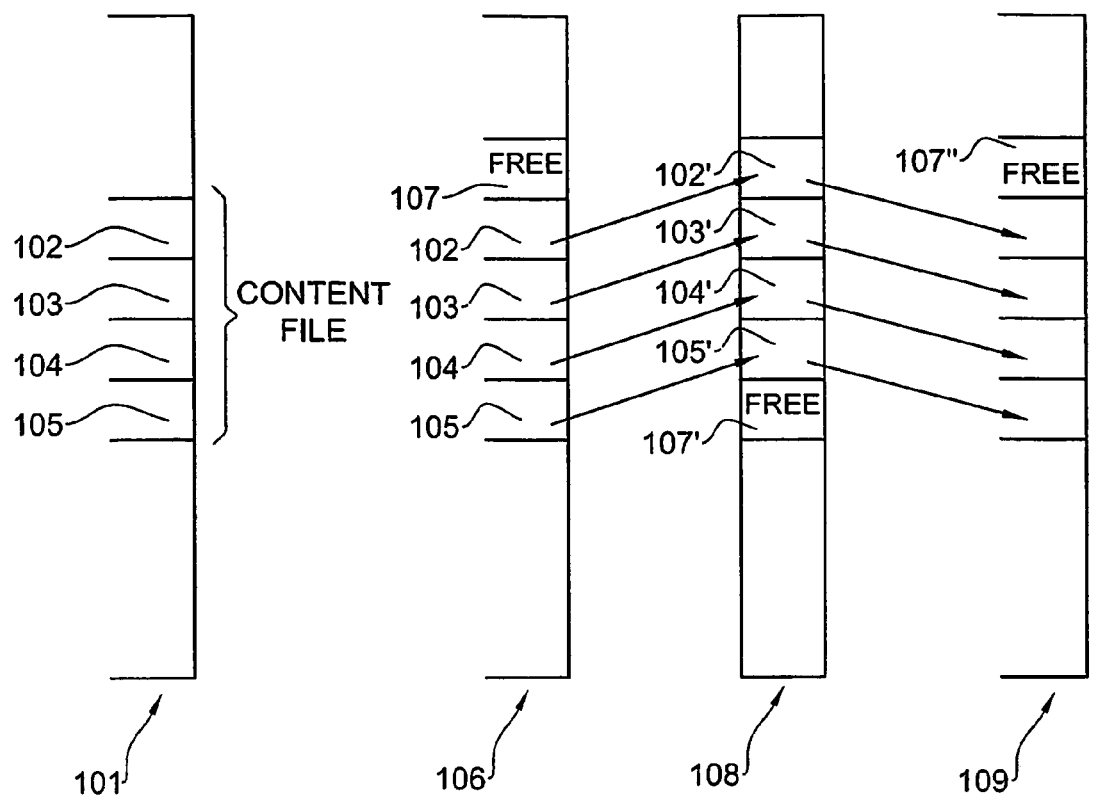
FIG. 1C illustrates an exemplary embodiment of a simple update-and-shift scheme using space augmentation, according to one embodiment of the invention.

FIG. 1C illustrates an exemplary embodiment of a simple update-and-shift scheme using space augmentation, according to one embodiment of the invention. A file (101) having four blocks (marked with reference numerals 102, 103, 104 and 105) is stored on a storage device, for example, in a non-volatile memory of a cellular telephone. When updating the file 101 it is possible to avoid the need of using an auxiliary backup block by enlarging the space used by the file by at least one block, referred to as an "augmentation space". A file having an augmentation space is referred to as an "enlarged file" or as an "augmented file". The file 106 is an exemplary enlarged file equivalent to file 101, where the augmentation space 107, whose size is one block, is at the beginning of the file.

The augmentation space forms free space used for writing in the update process. When in-place updating the file 106 to form a new version 108, old blocks (102, 103, 104 and 105) can be shifted by the number of blocks forming the free space 107, giving rise to respective new blocks (102', 103', 104', 105' and 107' that is the free space) in a new version 108. It is realized that if the content of a new block is different than the content of its respective old block, the change of content can be performed together with the shift operation or separately therefrom, being considered together as an up date operation. During update it is allowed to modify only part (or none) of the old blocks, while only shifting the others to occupy the free space. For example, in the figure the new block 102' can be similar to the respective old block 102, while the new block 103' can be different than its respective old block 103. It is appreciated that in the new version 108, the free space 107' is located at the end of the file.

It is possible that an update process can update only few of the blocks where shifting the whole file can be a longer operation then perfuming an in-place update for those updated blocks. It is even possible that none of the blocks is updated and only new blocks are inserted exactly in place of the augmentation place, to create the new file. In such a case no shift or backup buffer operations are performed. In general, the amount of blocks updated by shift operations and those updated by backup buffer can be pre-determined at the time of the update package generation and similarly during the update process, achieving even further improvement in time of the in-place update process.

It should be noted that in the illustrated example, the size of each new block is similar to the size of its respective old block. However, if the size of a new block is smaller than the size of its respective old block, the illustrated example still applies. In such case (not shown), the size of the new version's free space (107') is larger than the size of the old version's augmentation space (107).

After the update, further updates are allowed, forming even newer versions thereby. That is, in a further update process, the currently augmented file 108 (being the new version of the previous update process) will become an old version, wherein the update process will form a new augmented file (109). However as seen in the figure, the free space (107') of this old version (108) is located at the end of the file. Therefore, when updating this old version (108), the update process can shift the blocks in the opposite direction, forming the free space (107") of new version (109) at the beginning of the file.

Therefore, as illustrated in this example, in an augmented file the free space can alternate between the beginning and the end of the file.

It will be appreciated from the foregoing that a certain file can have one of two possible alternative forms indicating at which end of the file the free space is located.

In one form, referred to hereinafter as a "B-form" the free space is at the beginning of the file, wherein in the other form, the "E-form", the free space is at the end of the file. The blocks of the B-form and the E-form (except from the free space) are equivalent. That is, before updating an old version of a file, it should be considered that this old version can be either in B-form or in E-form. It should also be appreciated that by updating a certain form of an old version, the alternative form is being created. And more specifically, by updating an E-form old version, a B-form new version is created, and vice versa.

Usually, when updating a file, the content of at least part of the blocks can change. The update process receives as input at least one or more instructions and/or data to be used for generation of new content, comprising together an "update package". Methods for update processes are known in the art, see for example U.S. Pat. No. 6,546,552.

There may be different update packages corresponding to the available forms of an old version. That is, it should be appreciated that an update package prepared for updating a B-form.old version (B-update package) may be different than the update package prepared to update the equivalent E-form old version (E-update package). Amongst other differences, the E-update package updates the file from its end towards its beginning ("E-update"), while the B-update package updates the file from its beginning towards its end ("B-update").

However, this embodiment is non-limiting and in a different embodiment a combined update package may exist, allowing both B-update and E-update as appropriate to the case. It should be appreciated that in this case the combined update package corresponds both to the B-form and to the E-form of the old version.

Figure 2:
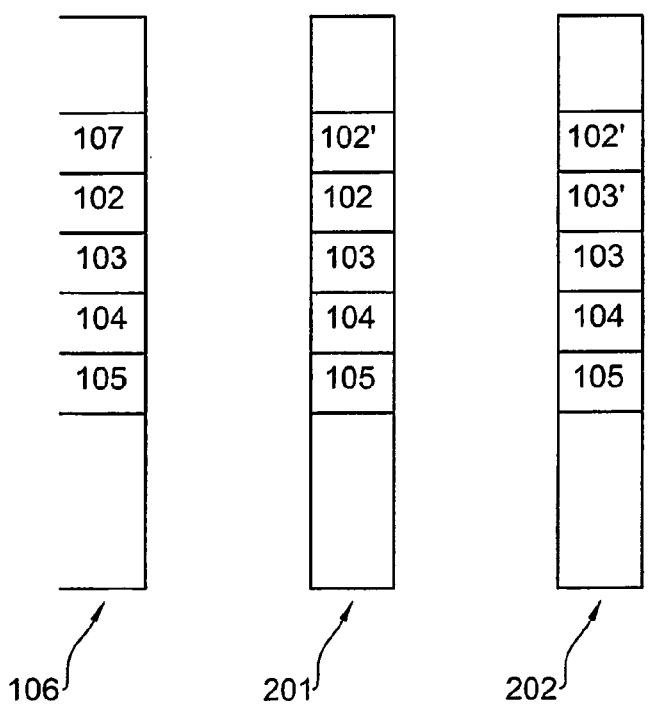
FIG. 2 illustrates the file of FIG. 1 in different stages of the update process, according to one embodiment of the invention.

It should be remembered that the update process is an in-place update process. Therefore, when copying block 102 in to block 102', for example, if the size of the free space is one block, immediately after copying and shifting block 102, the storage device will have a structure 201 illustrated in FIG. 2. It can be appreciated that block 102 (the old block) still exists while block 102' (the new block) is already written on to the storage device. It is therefore possible to verify that the content of block 102 was correctly updated (forming block 102') before updating block 103 (reflected in the storage device's structure 202).

A person versed in the art can appreciate that verification can be done, for example, by bitwise comparing the new block with update data stored in memory, such as in RAM (Random Access Memory). After reading an old block from the storage device, the update process can modify the content read (by the aid of the update package). The resulting updated content is first stored in RAM, and then the process writes it in to the storage device. It is therefore possible to bitwise compare the written new block with the data stored in RAM, to verify that the writing procedure was terminated without faults.

If the verification process finds out that a certain new content has faults, it can abort the update process. However, as the old block (102 in the above example) still exists, the update process can also retry to update the old block. It should be appreciated that if the process is aborted, it will be possible to re-activate it again, starting from the block where it was aborted. If, when starting to update a block, the update process writes in a non volatile memory block an identification of the block it is going to handle, and the size of the new content that is the result of the update of the old block, the re-activated update process would be able to determine where (at what block) to start updating. As before, the old block still exists on the storage device, and therefore the update process can continue.

Figure 3A:
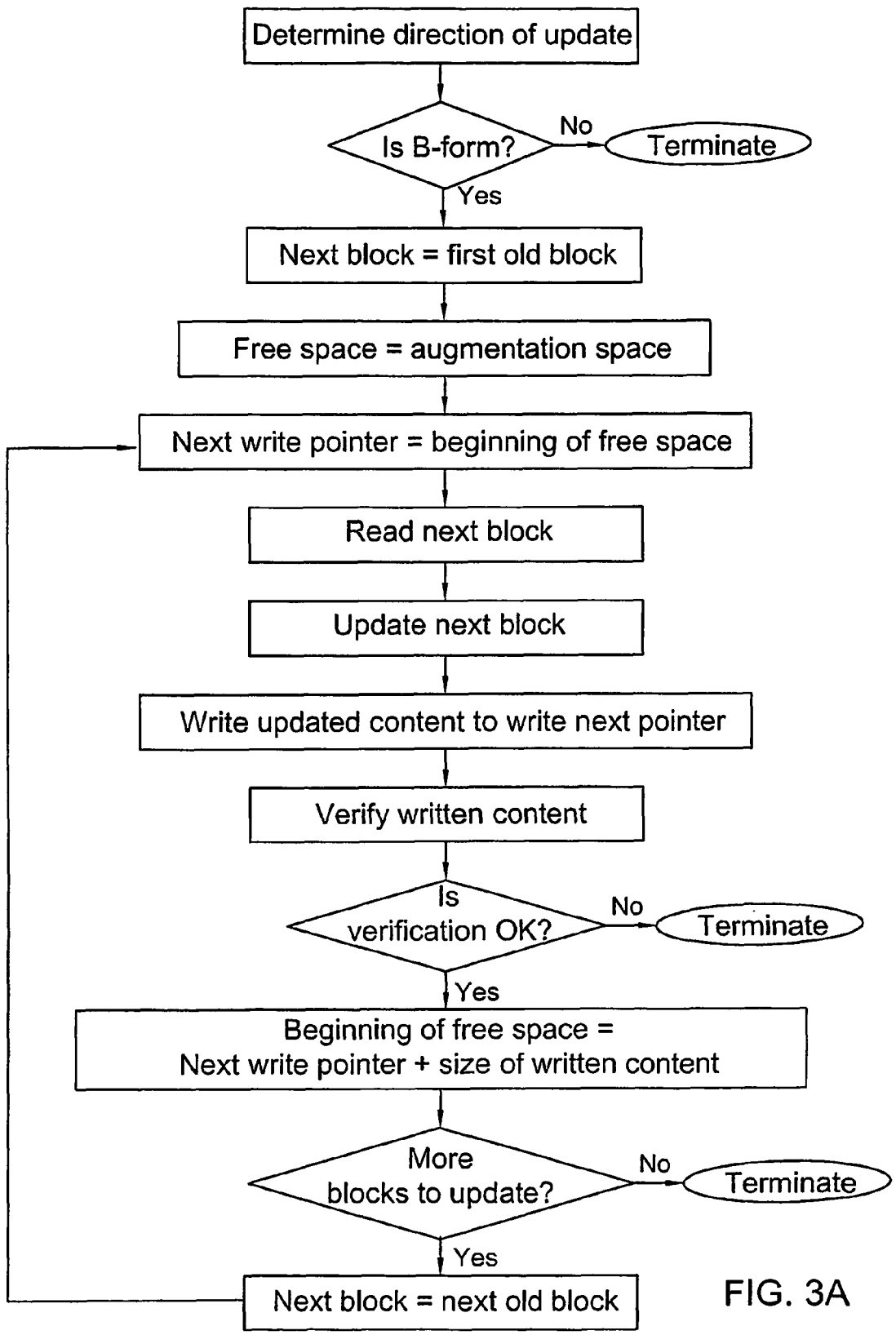
FIG. 3A is a flowchart illustrating B-update of a file in a simple update-and-shift scheme using space augmentation.
Figure 3B:
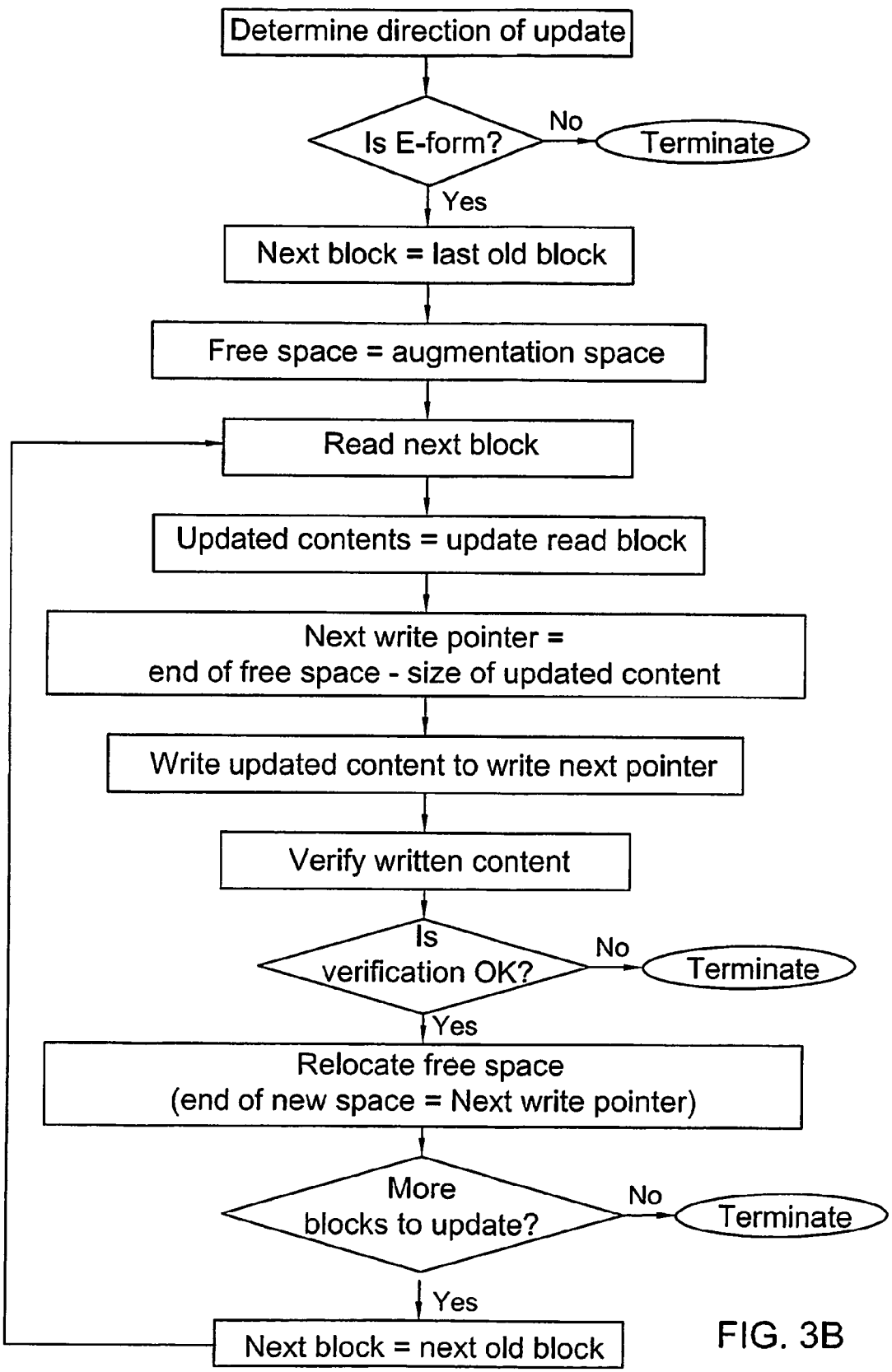
FIG. 3B is a flowchart illustrating E-update of a file in a simple update-and-shift scheme using space augmentation.

FIG. 3A is a flowchart illustrating B-update of a file in a simple update-and-shift scheme using file augmentation. If the file's old version is in B-form, it is appreciated that a B-update package is required to perform the update of blocks to generate a new version. Therefore, if while determining the direction (i.e., the form) of the received update package it is found that it is not in B-form, the update process terminates. It can be appreciated that in this case, if an E-update package is accessible to the update process, instead of terminating the update process can turn to be an E-update process, as illustrated in FIG. 3B below.

A B-update process starts from the beginning of a file and advances towards it end. Therefore, the first block to be updated is the first block in file, i.e., the first old block. The free space is initially the augmentation space, as explained before. The update process writes updated content to blocks starting at address referred to, in the flowchart as "Next write pointer". The next write pointer is set to be at the beginning of the free space.

After reading the next block and updating its content, the update process writes the updated content on to the next write pointer, to occupy at least part of the free space thereby. It should be noted that while updating the content the update process can modify the content, adapt it to be suitable to its shifted location (for example: if the content includes software, addresses should be adapted, as can be appreciated by a person versed in the art), delete the old content, replace it or add new content etc. It should also be noted that if the update process deletes the old block, the "write" operation does nothing.

After writing the updated content to occupy at least part of the free space (giving rise to new content), the new content is verified, testing the integrity of data stored on the storage device, as was explained before with reference to FIG. 2. If the verification finds that the previous write operation failed, the update process terminates. It is noted however that the embodiment illustrated is non-limiting and different approaches are allowed as well, such as re-trying to write the updated content.

After successfully verifying the updated content, the update process is allowed to override the old content. This is equivalent for declaring that the space occupied by the old content is now part of the free space that the update process can use for writing updated content of other old blocks. Therefore, the beginning of this "new" free space is the beginning of the "previous" free space (represented also by the Next write pointer), plus the size of the written updated content, "relocating" the free space thereby.

If there are more blocks in the old content, the next old block turns to be the next block to be updated, and the process is repeated as long as there are more old blocks to update.

It should be noted that in those cases when only part of the block included in the old version are updated according to the method illustrated in FIG. 3A, selecting the next block as illustrated in FIG. 3A means selecting the next block that has to be updated according to the method. In addition, testing "more blocks to update" means testing if there are more blocks that are needed to be updated according to the method.

FIG. 3B is a flowchart illustrating E-update of a file in a simple update-and-shift scheme using space augmentation.

After describing FIG. 3A in detail, it can be appreciated that the E-update method of FIG. 3B resembles the B-update method of FIG. 3A, but instead of a B-update package, an E-update package is required.

Also, an E-update process advances from the end of the old version's file towards it beginning, an opposite direction to the B-update process. Accordingly, the next block is initially set to be the last old block and later it is retreated to be the previous old block.

In addition, it should be remembered that the free space size can be larger than the size of the updated content. Therefore, unlike the B-update process, the Next write pointer is not set to the beginning of the free space, but to the end thereof, minus the size of the updated content. Later, when the free space is relocated to override the previously old block (after verification), it is the Next write pointer that becomes the end of the relocated free space.

It was previously noted, in relation to FIG. 1, that the new blocks are smaller or equal in size to their respective old blocks. However, it happens that that new blocks are larger in size than their respective old blocks. In this case, after updating a larger updated block, the size of the free space becomes smaller than it was before the update of this block. If another block will be larger than its respective old block, the size of the free space will decrease even more, until the size of the free space will become too small to accommodate the size of the next new block. Looking back at FIG. 2, if the size of the free space 107, in the beginning of the update process was smaller than the size of new block 102', it would have become impossible to write 102' as it would override and corrupt old block 102. If the update process fails, in this case, it would be impossible to re-update block 102.

In this case two approaches are available. According to one embodiment, when the size of the free space is too small to accommodate a new block, it is possible to revert back to the method currently know in the art, using an auxiliary backup block.

Alternatively, according to a different embodiment, it is possible to receive, in association with an update package (referred to as an original update package), a predetermined required free space size. Before starting the update process with the original update package, the update process can determine whether an amount of free space in the old version is large enough to allow in-place update of the old version to the new version, by comparing the size of the free space with the update package's predetermined required free space. If it is found out that the size of the initial free space is smaller than the predetermined required free space size, it is possible to enlarge the size of the free space to a size allowing the update process to run. For example, it is possible to run a special update process (referred to as "enlarging update process") that only copies the old version into a new version while shifting the blocks and enlarging the free space thereby, therefore generating an enlarged new version which is equivalent to the old version but has a larger free space and an inverted form (that is, if the old version was in B-form, the new version is in E-form and vice versa). Now it is possible to receive and run an alternated update package which is equivalent to the original update package.

It should be noted that in those cases when only part of the block included in the old version are updated according to the method illustrated in FIG. 3B, selecting the next block as illustrated in FIG. 3B means selecting the next block that has to be updated according to the method. In addition, testing "more blocks to update" means testing if there are more blocks that are needed to be updated according to the method.

FIG. 4 is a block diagram illustrating a system allowing in-place update according to one embodiment of the invention. A server 401 can generate update packages in any method known in the art. The server than transmits the update packages to remote devices (such as remote device 402) having a remote processor (403) where the update process can run. The remote device 401 is in association with a storage devices (such as storage device 404), where the old versions are stored. The storage device includes non volatile memory. The remote processor can also be in association with volatile memory, such as RAM (405), used in the update process.

According to a different embodiment (not shown), the update packages can be generated on a device local to the device where the update process is running. For example, an enlarging update process can operate on an enlarging update package that is stored on the device's local non volatile memory. When a file needs to be enlarged, the update process can generate an update package from the stored enlarging update package, provide the required free space to it, and enlarge the file thereby.

It will also be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

The present invention has been described with a certain degree of particularity, and accordingly those versed in the art will readily appreciate that various alterations and modifications may be carried out without departing from the scope of the following claims:

It will also be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

The invention claimed is:

1. A method for in-place updating an old version of a file stored on a storage device to form a new version, the old version including blocks, the method comprising:
   determining a form of said old version, said determined form indicating an end of the old version at which free space is located;
   comparing a form of a received update package, which indicates a direction in which said received update package updates a file, with said form of said old version to determine if said update package corresponds to said form of said old version;
   determining whether the amount of free space in the old version is large enough to allow in-place update of the old version to the new version; and
   when the amount of free space in the old version is determined to be large enough to allow in-place update, updating blocks in said old version in said direction of said update package, if said form of said received update package corresponds to said determined form of said old version, such that a new version having an alternative form is generated, wherein free space in the new version is located at an end opposite to that of the old version.

2. The method of claim 1, wherein said determined form of said old version is a B-form and wherein said alternative form of said new version is an E-form.

3. The method of claim 1, wherein said determined form of said old version is an E-form and wherein said alternative form of said new version is a B-form.

4. The method of claim 1, further comprising:
for each block in said new version, verifying that content in said new block is successfully stored.

5. The method of claim 1 wherein said storage device is accommodated in a cellular telephone.

6. The method of claim 1, further comprising:
when the amount of free space in the old version is not determined to be large enough to allow in-place update, enlarging said free space to allow said in-place update, wherein said enlarging includes:
updating said old version to a temporary version having content equivalent to said old version with an alternative form to said old version and a larger free space than in said old version; and
updating said temporary version to form said new version.

7. An apparatus for in-place updating an old version of a file stored on a storage device to form a new version, the old version including blocks, the apparatus comprising:
a storage device; and
a processor configured to perform the following:
determine a form of said old version, said determined form indicating an end of the old version at which free space is located; compare a form of a received update package, which indicates a direction in which said received update package updates a file, with said form of said old version to determine if said form of said update package corresponds to said determined form of said old version;
determining whether the amount of free space in the old version is large enough to allow in-place update of the old version to the new version; and
update blocks in said old version in said direction of said update package, if said form of said received update package corresponds to said determined form of said old version, such that a new version having an alternative form is generated, wherein free space in the new version is located at an end opposite to that of the old version.

8. A program storage memory readable by machine, tangibly embodying a program of instructions executable by the machine to perform a method for in-place updating an old version of a file stored on a storage device to form a new version, the old version including blocks, the method comprising:
determining a form of said old version, said determined form indicating an end of the old version at which free space is located;
comparing a form of a received update package, which indicates a direction in which said received update package updates a file, with said form of said old version to determine if said form of said received update package corresponds to said form of said old version;
determining whether the amount of free space in the old version is large enough to allow in-place update of the old version to the new version; and
updating blocks in said old version in said direction of said received update package, if said form of said received update package corresponds to said form of said old version, such that a new version having an alternative form is generated, wherein free space in the new version is located at an end opposite to that of the old version.

9. A computer program-product comprising a non-transitory computer useable medium having computer readable program code embodied therein for in-place updating an old version of a file stored on a storage device to form a new version, the old version including blocks, the computer program product comprising:
computer readable program code for causing the computer to determine (i) a form of said old version, said determined form indicating at which end of the old version free space is located, and (ii) if a form of a received update package, indicating a direction in which said received update package update a file, corresponds to said form of said old version;
computer readable program code for causing the computer determine whether the amount of free space in the old version is large enough to allow in-place update of the old version to the new version; and
computer readable program code for causing the computer, upon determining the form of said old version and that the received update package corresponds to said form of said old version, to update blocks in said old version the update direction of said corresponding update package, such that a new version having an alternative is generated, wherein free space in the new version located at an end opposite to that of the old version.

* * * * *